US011294719B2

(12) United States Patent
Rajendran et al.

(10) Patent No.: US 11,294,719 B2
(45) Date of Patent: Apr. 5, 2022

(54) GENERATING METRICS FOR QUANTIFYING COMPUTING RESOURCE USAGE BASED ON COST AND UTILIZATION OF VIRTUALIZED SERVICES AND OPTIMIZING PERFORMANCE THROUGH VIRTUALIZED SERVICE MIGRATION

(71) Applicant: VMware, Inc., Palo Alto, CA (US)

(72) Inventors: Mageshwaran Rajendran, Bangalore (IN); Sivaraj M, Bangalore (IN); Karthik Seshadri, Bangalore (IN); Atul Jadhav, Bangalore (IN); Nibunan G S, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 262 days.

(21) Appl. No.: 16/037,298

(22) Filed: Jul. 17, 2018

(65) Prior Publication Data

US 2020/0026565 A1 Jan. 23, 2020

(51) Int. Cl.
*G06F 9/50* (2006.01)
*G06F 9/455* (2018.01)
*G06Q 10/06* (2012.01)
*G06Q 30/02* (2012.01)

(52) U.S. Cl.
CPC ........ *G06F 9/5011* (2013.01); *G06F 9/45558* (2013.01); *G06F 2009/4557* (2013.01); *G06Q 10/063* (2013.01); *G06Q 10/06375* (2013.01); *G06Q 30/02* (2013.01); *G06Q 30/0206* (2013.01)

(58) Field of Classification Search
CPC .............. G06F 9/5011; G06F 9/45558; G06F 2009/4557; G06Q 10/06375; G06Q 10/063; G06Q 30/0206; G06Q 30/02
See application file for complete search history.

(56) References Cited

U.S. PATENT DOCUMENTS

| 7,526,550 B2* | 4/2009 | Frey ................... G06F 11/3476 709/224 |
| 7,703,079 B1* | 4/2010 | Burrows ............. G06F 11/3447 717/127 |
| 9,772,927 B2* | 9/2017 | Gounares ............. G06F 11/079 |
| 2003/0014464 A1* | 1/2003 | Deverill ............. G06F 11/3419 718/101 |
| 2010/0036698 A1* | 2/2010 | Garrison ................ G06Q 10/06 705/16 |

(Continued)

*Primary Examiner* — Michael W Ayers
(74) *Attorney, Agent, or Firm* — Thomas | Horstemeyer LLP

(57) ABSTRACT

Various examples are disclosed for generating metrics for quantifying computing resource usage. A computing environment can identify a computing function that utilizes a plurality of computing services hosted in at least one virtual machine. The computing environment can determine a first cost metric for the at least one virtual machine based on hardware resources used by the at least one virtual machine and determine a second cost metric for individual ones of the computing services based on virtual machine resources used by the individual ones of the computing services and the first cost metric. A third cost metric can be determined for the computing function as a function of the second cost metric and a utilization ratio.

17 Claims, 9 Drawing Sheets

(56) References Cited

U.S. PATENT DOCUMENTS

| | | | |
|---|---|---|---|
| 2011/0145380 A1* | 6/2011 | Glikson | G06F 9/4856 709/223 |
| 2012/0260248 A1* | 10/2012 | Katiyar | G06F 9/45533 718/1 |
| 2012/0331114 A1* | 12/2012 | Garg | G06Q 10/00 709/220 |
| 2014/0337837 A1* | 11/2014 | Padala | G06F 9/5072 718/1 |
| 2016/0203528 A1* | 7/2016 | Saha | G06Q 30/04 705/34 |
| 2016/0371109 A1* | 12/2016 | Palavalli | G06F 9/45558 |
| 2018/0027061 A1* | 1/2018 | Jian | H04L 67/1008 709/226 |
| 2018/0097705 A1* | 4/2018 | Srivastava | H04L 43/08 |
| 2018/0246757 A1* | 8/2018 | Li | G06F 9/4856 |
| 2019/0095245 A1* | 3/2019 | Abes | G06F 9/5072 |
| 2020/0045116 A1* | 2/2020 | Deodhar | G06F 9/5077 |

\* cited by examiner

GENERATING METRICS FOR QUANTIFYING COMPUTING RESOURCE USAGE BASED ON COST AND UTILIZATION OF VIRTUALIZED SERVICES AND OPTIMIZING PERFORMANCE THROUGH VIRTUALIZED SERVICE MIGRATION

BACKGROUND

Data centers include various physical and virtual components that, when executed, provide web services, cloud computing environments, virtualization environments, as well as other computing systems. For instance, computer virtualization relates to the creation of a virtualized version of a physical device, such as a server, a storage device, a central processing unit (CPU), a graphics processing unit (GPU), or other computing resources. Data centers can also include virtual machines (VMs), which include emulations of a computer system that can be customized to include a predefined amount of random access memory (RAM), hard drive storage space, as well as other computing resources that emulate a physical machine. Operating a data center can involve maintaining hundreds to thousands of CPUs, GPUs, and other physical hardware, as well as corresponding software.

A container (also referred to as a "computing container") is a self-contained execution environment having its own CPU, memory, block input/output (I/O), and network resources. Additionally, a computing container is isolated from other containers. Containers can be hosted by virtual machines in some examples. In the current era of containers and other similar micro-services, computing functions often leverage multiple computing services, such as network-based application programming interfaces (APIs) that can be invoked to process and generate data. However, many computing services are often re-used and are invoked by more than one computing function. As such, determining the infrastructure cost required to perform a computing function or maintain computing services is becoming increasingly challenging.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
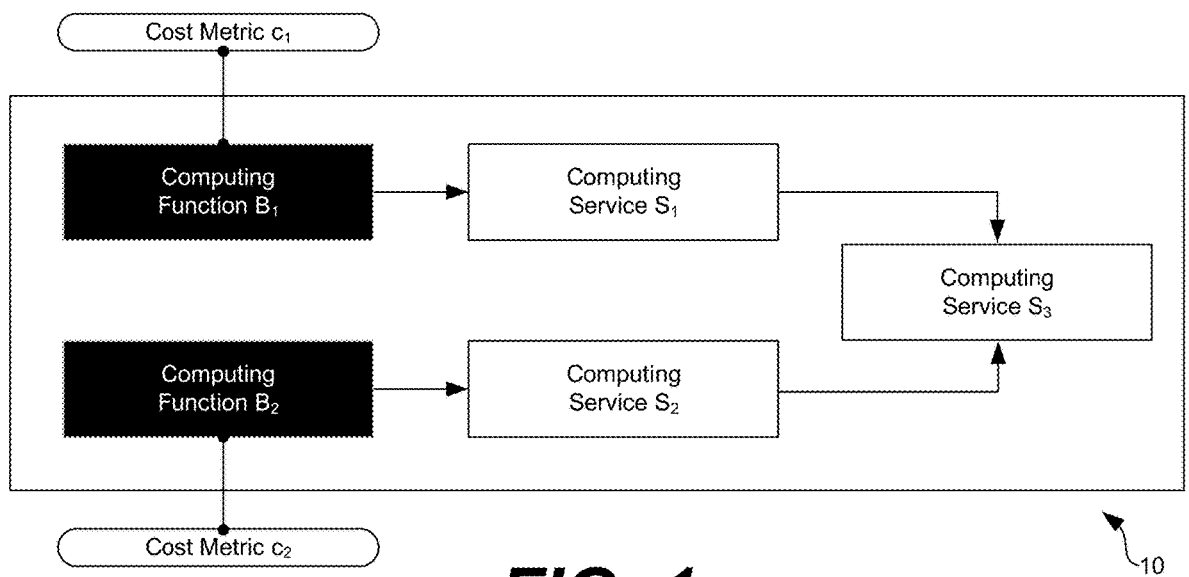
FIG. 1 is a drawing of computing functions that invoke multiple computing services.

The present disclosure relates to generating metrics for quantifying computing resource usage. Organizations, such as information technology (IT) enterprises, often desire to estimate costs incurred when performing a computing function, such as operating a single sign-on service or performing another computing function. For instance, an organization may desire to determine costs an entity incurs when a new account is created to provide a customer with virtual computing resources. However, these costs are often grossly misestimated as creating a new account may utilize various computing services that are also used by other non-related computing operations. Thus, costs for providing various computing functions that invoke multiple computing services are difficult to accurately estimate.

As such, various examples are described herein for determining costs for implementing a computing function that invokes multiple services. Determining costs for implementing a computing function can require determining underlying virtual machine and hardware resource costs incurred by the services as well as determining a utilization ratio that accounts for only the usage of the service in implementing the computing function. The various examples described herein are directed towards improvements in conventional IT cost management systems as the examples described herein are able to provide an entity with the ability to identify more accurate listing of costs incurred when performing a computing function. As a result, the entity may identify resource intensive business services, find areas for business and computing resource optimization, and identify whether investments are aligned with organizational goals.

In various examples described herein, a computing environment can identify a computing function that utilizes multiple computing services hosted in one or more virtual machines, such that an accurate cost metric can be determined for the computing function based on actual computing resources required to perform the computing function. To this end, the computing environment can determine a first cost metric for a virtual machine having a computing service executing therein based on hardware resources used by the virtual machine in performing the computing function. The computing environment can then determine a second cost metric for each of the computing services based on virtual machine resources used by the computing services and the first cost metric.

Thereafter, the computing environment can generate a utilization ratio for individual ones of the computing services in performing the computing function. In some examples, the computing environment can determine the utilization ratio using a distributed tracing routine that identifies a service lineage of the computing services, where the distributed tracing routine is performed by tracing a flow of a unique identifier throughout the computing services. Using the utilization ratio and the second cost metric, the computing environment can determine a third cost metric for the computing function that describes the cost of providing the computing function. The computing environment that generates the third cost metric is an improvement over conventional systems as it (a) accounts for the actual usage of computing resources when performing a computing operation, (b) does not ignore costs of services operated by other entities, and (c) accounts for the inter-dependencies and sharing of computing services.

Turning now to FIG. 1, a schematic diagram 10 is shown according to various examples. The schematic diagram includes computing function $B_1$ and computing function $B_2$. When performing a computing function, the computing function can invoke (or make requests to) various computing services $S_1 \ldots S_3$. For instance, computing function $B_1$ is shown invoking computing service $S_1$. However, invoking the computing service $S_1$ causes the computing service $S_1$ to invoke computing service $S_3$. Similarly, computing function $B_2$ is shown invoking computing service $S_2$. Invoking the computing service $S_2$ can invoke computing service $S_3$. It is problematic to determine the cost of performing computing function $B_1$ as computing service $S_3$ is invoked by other computing services and computing functions.

In one example, the computing function $B_1$ can include a single sign-on function and the computing function $B_2$ can include a new user enrollment function. As such, the computing service $S_1$ can include a single sign-on service and the computing service $S_2$ can include a user enrollment service. However, both the single sign-on service and the user enrollment service requires a downstream authentication service, such as computing service $S_3$. Notably, computing services S are rarely self-sufficient and often require interaction with other services. As the authentication service may be operated by another, different entity or organization unit, determining accurate cost metrics $c_1$, $c_2$ for the computing functions $B_1$ and $B_2$ can be difficult. As the computing service $S_3$ can include a computing service that is used only internally (or within an enterprise or other entity) by service $S_1$ and computing service $S_2$, the operating costs of computing service $S_3$ should be included into costs for operating computing services $S_1$ and $S_2$. Conventional systems often ignore or crudely estimate these costs, leading to gross inaccuracies in customer chargeback and budgeting.

Figure 2:
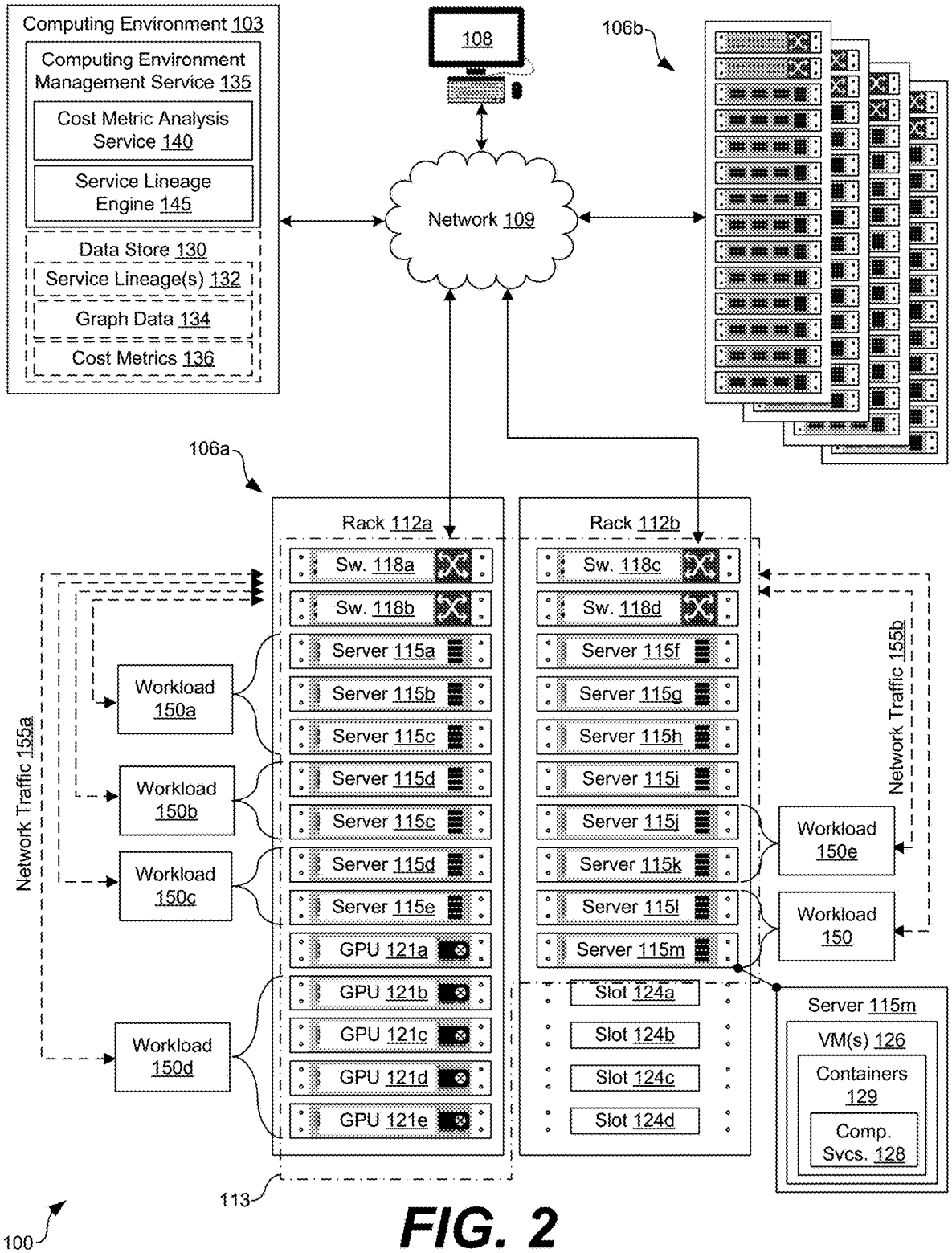
FIG. 2 is a drawing of an example of a networked computing environment having a computing environment management service configured to generate metrics for computing functions.

With reference to FIG. 2, an example of a networked environment 100 is shown. The networked environment 100 can include a computing environment 103 and various computing systems 106a . . . 106b in communication with one other over a network 109. The network 109 can include, for example, the Internet, intranets, extranets, wide area networks (WANs), local area networks (LANs), wired networks, wireless networks, other suitable networks, or any combination of two or more such networks.

For example, the networks can include satellite networks, cable networks, Ethernet networks, telephony networks, and other types of networks. In some examples, the networked environment 100 can serve up virtual desktops to end users and, thus, can also be described as a virtual desktop infrastructure (VDI) environment. In other examples, the networked environment 100 can provide a public cloud computing environment, a private cloud computing environment, or a hybrid cloud computing environment. As such, the networked environment 100 can be referred to as a cloud computing environment in some examples.

In various embodiments, the computing systems 106 can include a plurality of devices installed in racks 112 which can make up a server bank, aggregate computing system, or a computer bank in a data center or other like facility. In some examples, the computing systems 106 can include high-availability computing systems. A high-availability computing system is a group of computing devices that act as a single system and provides a continuous uptime. The devices in the computing systems 106 can include any number of physical machines, virtual machines, virtual appliances, and software, such as operating systems, drivers, hypervisors, scripts, and applications.

In some examples, a computing environment 103 can include an enterprise computing environment that includes hundreds or even thousands of physical machines, virtual machines, and other software implemented in devices stored in racks 112, distributed geographically, and connected to one another through the network 109. It is understood that any virtual machine or virtual appliance is implemented using at least one physical device, such as a server.

The devices in the racks 112 can include various computing resources 113. The computing resources 113 can include, for example, physical computing hardware, such as memory and storage devices, servers 115a . . . 115m, switches 118a . . . 118d, graphics cards (having one or more GPUs 121a . . . 121e installed thereon), central processing units (CPUs), power supplies, and similar devices. The devices, such as servers 115 and switches 118, can have dimensions suitable for quick installation in slots 124a . . . 124d on the racks 112. In various examples, the servers 115 can include requisite physical hardware and software to create and manage virtualization infrastructure or a cloud computing environment. In some examples, the computing resources 113 can also include virtual computing resources, such as virtual machines or other software.

In some examples, the servers 115 can include a pre-configured hyper-converged computing device where a hyper-converged computing device includes pre-tested, pre-configured, and pre-integrated storage, server and network components, including software, that are positioned in an enclosure installed in a slot 124 on a rack 112. Additionally, if a server 115 includes an instance of a virtual machine, the server 115 can be referred to as a "host," while the virtual machine can be referred to as a "guest."

Each server 115, such as representative server 115m, can act as a host in the networked environment 100, and thereby can include one or more virtual machines 126 as well as a hypervisor. In some examples, the hypervisor can be installed on a server 115 to support a virtual machine execution space within which one or more virtual machines 126 can be concurrently instantiated and executed. In some examples, the hypervisor can include the ESX™ hypervisor by VMware®, the ESXi™ hypervisor by VMware®, or similar hypervisor. It is understood that the computing systems 106 are scalable, meaning that the computing systems 106 in the networked environment 100 can be scaled dynamically to include the addition or removal of servers 115, switches 118, GPUs 121, power sources, and other components, without degrading performance of a virtualization or cloud computing environment.

In various examples, one or more computing services 128 can be executed on one or more of the virtual machines 126. The computing services 128 can include, for example, web services in some examples that can be invoked by submitting requests for particular actions to be performed or for particular data to be returned. Additionally, in some examples, the computing services 128 can be implemented in computing containers 129 (hereinafter "containers 129"). Each of the containers 129 can include a self-contained execution environment having its own CPU, memory, block input/output (I/O), and network resources which is isolated from other containers 129. In some examples, a single one of the containers 129 can implement a single one of the computing service 128.

Referring now to the computing environment 103, the computing environment 103 can include, for example, a server or any other system providing computing capability.

Alternatively, the computing environment 103 can include one or more computing devices that are arranged, for example, in one or more server banks, computer banks, computing clusters, or other arrangements. The computing environment 103 can include a grid computing resource or any other distributed computing arrangement. The computing devices can be located in a single installation or can be distributed among many different geographical locations. Although shown separately from the computing systems 106, it is understood that in some examples the computing environment 103 can be included as all or a part of the computing systems 106.

The computing environment 103 can include or be operated as one or more virtualized computer instances in some examples. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing systems 106 and client devices 108 for end users over the network 109, sometimes remotely, the computing environment 103 can be described as a remote computing environment 103 in some examples. Additionally, in various examples, the computing environment 103 can be implemented in servers 115 of a rack 112 and can manage operations of a virtualized or cloud computing environment. Hence, in some examples, the computing environment 103 can be referred to as a management cluster in the computing systems 106.

The computing environment 103 can include a data store 130. The data store 130 can include memory of the computing environment 103, mass storage resources of the computing environment 103, or any other storage resources on which data can be stored by the computing environment 103. The data store 130 can include memory of the servers 115 in some examples. For instance, the data store 130 can include one or more relational databases, such as structure query language (SQL) databases, non-SQL databases, or other relational or non-relational databases. The data stored in the data store 130, for example, can be associated with the operation of the various services or functional entities described below.

The data store 130 can include a database or other memory that includes, for example, service lineages 132, graph data 134, cost metrics 136, as well as other data not discussed herein. The service lineages 132 can include information pertaining to computing services 128 invoked when performing a computing function. For example, referring to FIG. 1, the service lineage 132 for the computing function $B_1$ would include computing services 128 $S_1$ and $S_3$. The service lineage 132 details an order of transmission of requests or other data, as well as the source of a request for a downstream computing service 128. When generating service lineages 132 and cost metrics 136 for computing functions, the computing environment 103 can generate graphs, charts, or other visualizations that can be stored as graph data 134.

The components executed on the computing environment 103 can include, for example, a computing environment management service 135 as well as other applications, services, processes, systems, engines, or functionality not discussed in detail herein. The computing environment management service 135 can be executed to oversee the operation of the networked environment 100 through management of the computing systems 106 as well as the physical and virtual computing resources that make up the computing systems 106. In some examples, an enterprise, organization, or other entity can operate the computing environment management service 135 to oversee or manage the operation of devices in the racks 112, such as servers 115, switches 118, GPUs 121, power supplies, cooling systems, and other components.

Additionally, in some examples, the computing environment management service 135 can include a cost metric analysis service 140 and a service lineage engine 145. The cost metric analysis service 140 can generate cost metrics 136 for various computing functions as will be described. To do so with a higher degree of accuracy than conventional systems, the cost metric analysis service 140 can interact with the service lineage engine 145 to determine which computing services 128 are invoked when a computing function is performed.

The various physical and virtual components of the computing systems 106 can process workloads 150a . . . 150f. Workloads 150 can refer to the amount of processing that a server 115, switch 118, GPU 121, or other physical or virtual component has been instructed to process or route at a given time. The workloads 150 can be associated with virtual machines 126, public cloud services, private cloud services, hybrid cloud services, or other software executing on the servers 115. For instance, the workloads 150 can include tasks to be processed to provide employees of an enterprise with remote desktop sessions or other virtualized computing sessions.

The computing environment management service 135 can maintain a listing of active or inactive workloads 150 as well as oversee the assignment of various workloads 150 to various devices in the computing systems 106. For instance, the computing environment management service 135 can assign a workload 150 lacking in available resources to a server 115 that has resources sufficient to handle the workload 150. The workloads 150 can be routed to various servers 115 by the switches 118 as network traffic 155a . . . 155b.

Figure 3:
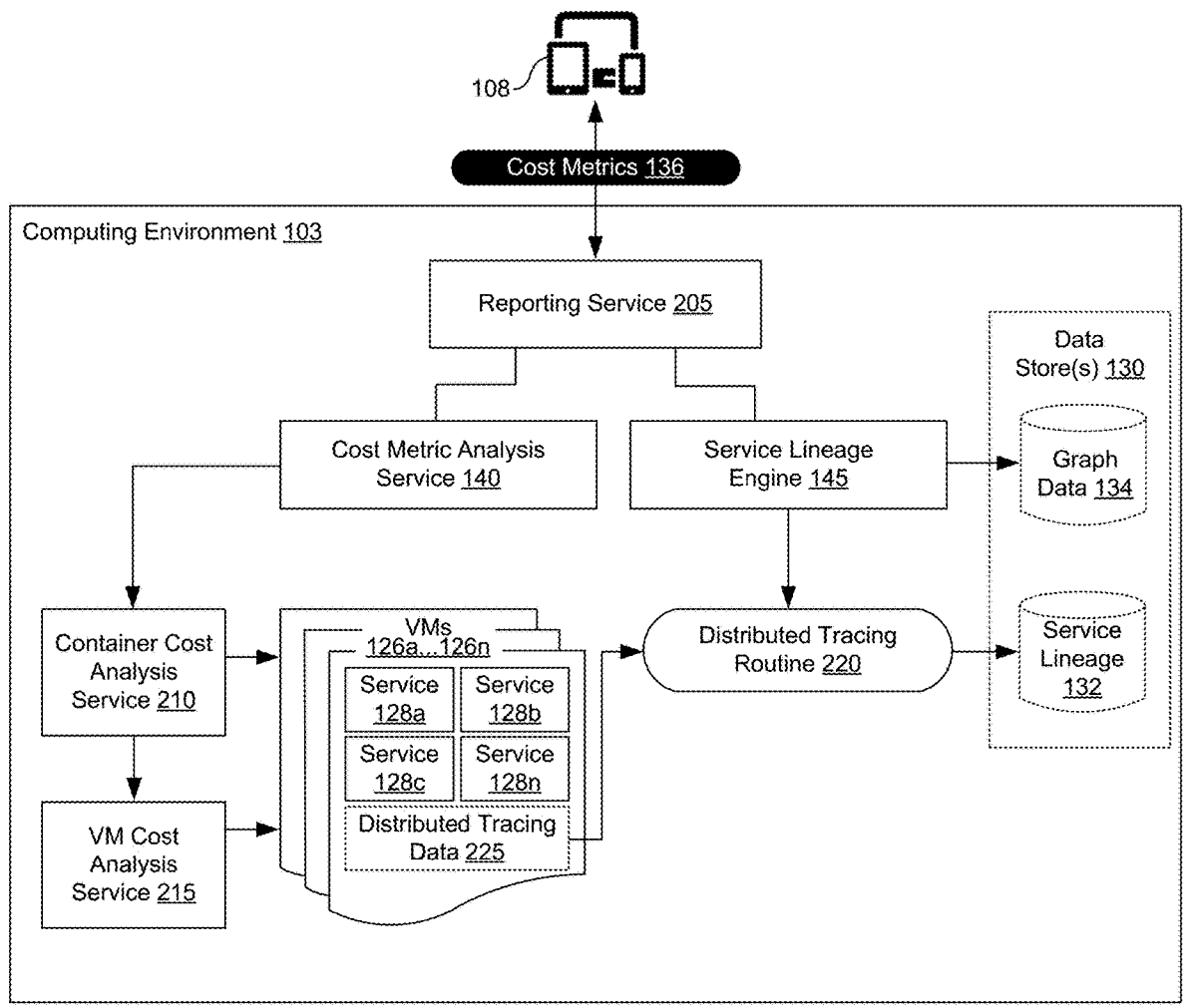
FIG. 3 is a drawing of an example architecture that can be used to generate metrics for computing functions.

Referring next to FIG. 3, another example of the computing environment 103 is shown having an architectural arrangement that can be used to generate cost metrics 136 for computing functions in accordance with various examples. The cost metrics 136 generated by the computing environment 103 can be sent to one or more client devices 108 from a reporting service 205 in various examples.

In addition to the cost metric analysis service 140, the service lineage engine 145, and the reporting service 205, the computing environment 103 can include, for example, a container cost analysis service 210, virtual machine cost analysis service 215, distributed tracing routine 220, as well as other applications and services not discussed herein. Also, the virtual machines 126a . . . 126n are shown hosting various computing services 128 . . . 128n.

As noted above, the cost metric analysis service 140 generates a cost metric 136 that describes a cost of performing a computing function. To generate the cost metric 136, the computing services 128 used to implement the computing function can be analyzed to determine their respective costs as well as to what extent those computing services 128 were used for the computing function. For example, a computing function can invoke computing service 128a and computing service 128b to implement desired functionality. The cost metric 136 for the computing function can include a sum of the cost of operating computing service 128a and computing service 128b. However, the computing service 128a and the computing service 128b can be used to implement other computing functions. As such, a utilization ratio can be used to determine to what extent the computing service 128a and the computing service 128b were executed to implement a particular computing function.

In some examples, the computing services 128 can be deployed as containers 129, such as Linux® containers or other suitable containers. As such, in some examples, it can be assumed that no computing services 128 share the same container 129 as this implementation is commonly employed in micro-service architectures. The cost of a computing service 128 is thus the same as a cost of running the container hosting a computing service 128.

To determine the cost of implementing a computing service 128 using a container 129 executing in a virtual machine 126, the cost metric analysis service 140 can interact with the virtual machine analysis service 215 to first determine the cost of the hardware resources used by virtual machine 126 in implementing the containers 129. Thereafter, the cost metric analysis service 140 can interact with the container cost analysis service 210 to determine the cost of each container 129 (or each computing service 128) in implementing the computing function.

However, prior to determining the cost of each container 129, it can be necessary to identify which ones of the computing services 128 are invoked (or called) during execution of a computing function. As such, the service lineage engine 145 can generate a service lineage 132 that identifies each one of the computing services 128 invoked. In some examples, the service lineage 132 can be generated using the distributed tracing routine 220. The distributed tracing routine 220 can include Zipkin® or other service. In various examples, the distributed tracing routine 220 can generate a request having a unique identifier. The distributed tracing routine 220 carries out the request by sending the request to a computing service 128. The computing service 128 that first receives the request can invoke other computing services 128, causing the unique identifier to propagate downstream through a subset of the computing services 128.

In addition, the distributed tracing routine 220 can generate distributed tracing data 225, which can include a start time and an end time at each stage in the service lineage 132. The start time and the end time can be used to determine the utilization ratio, as will be discussed. Further, the service lineage engine 145 can generate one or more graphs, charts, or other visualizations for displaying one or more cost metrics 136 on one or more client devices 108.

Figure 4:
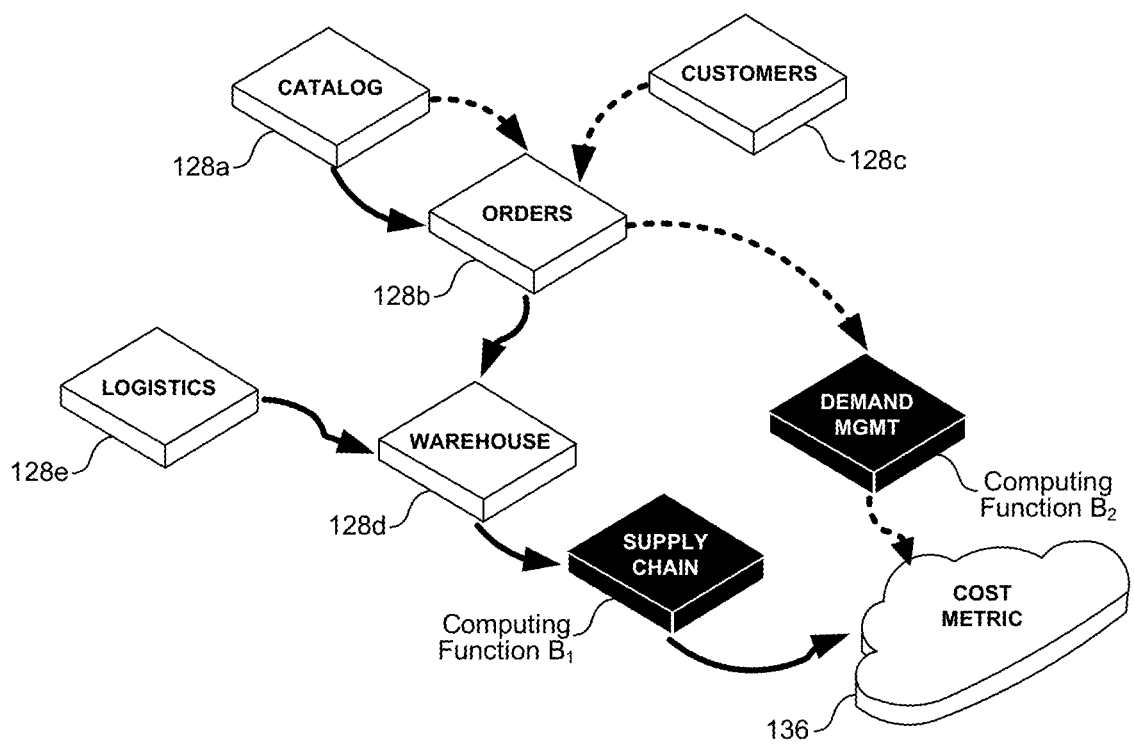
FIG. 4 is an example of a use case for generating a metric for a computing function that relies on various computing services.

Referring next to FIG. 4, an example use case for generating a cost metric 136 for a first computing function $B_1$ and a second computing function $B_2$ is shown that relies on various computing services 128a . . . 128e. For instance, the first computing function $B_1$ can include a function performed in association with maintaining a supply chain while the second computing function can include a function performed in association with demand management. The inter-service dependencies of the computing services 128 are shown with solid and dashed arrows, respectively. Notably, a service lineage 132 is shown for both the first computing function $B_1$ and a second computing function $B_2$ denoted by the solid and dashed lines.

Figure 5:
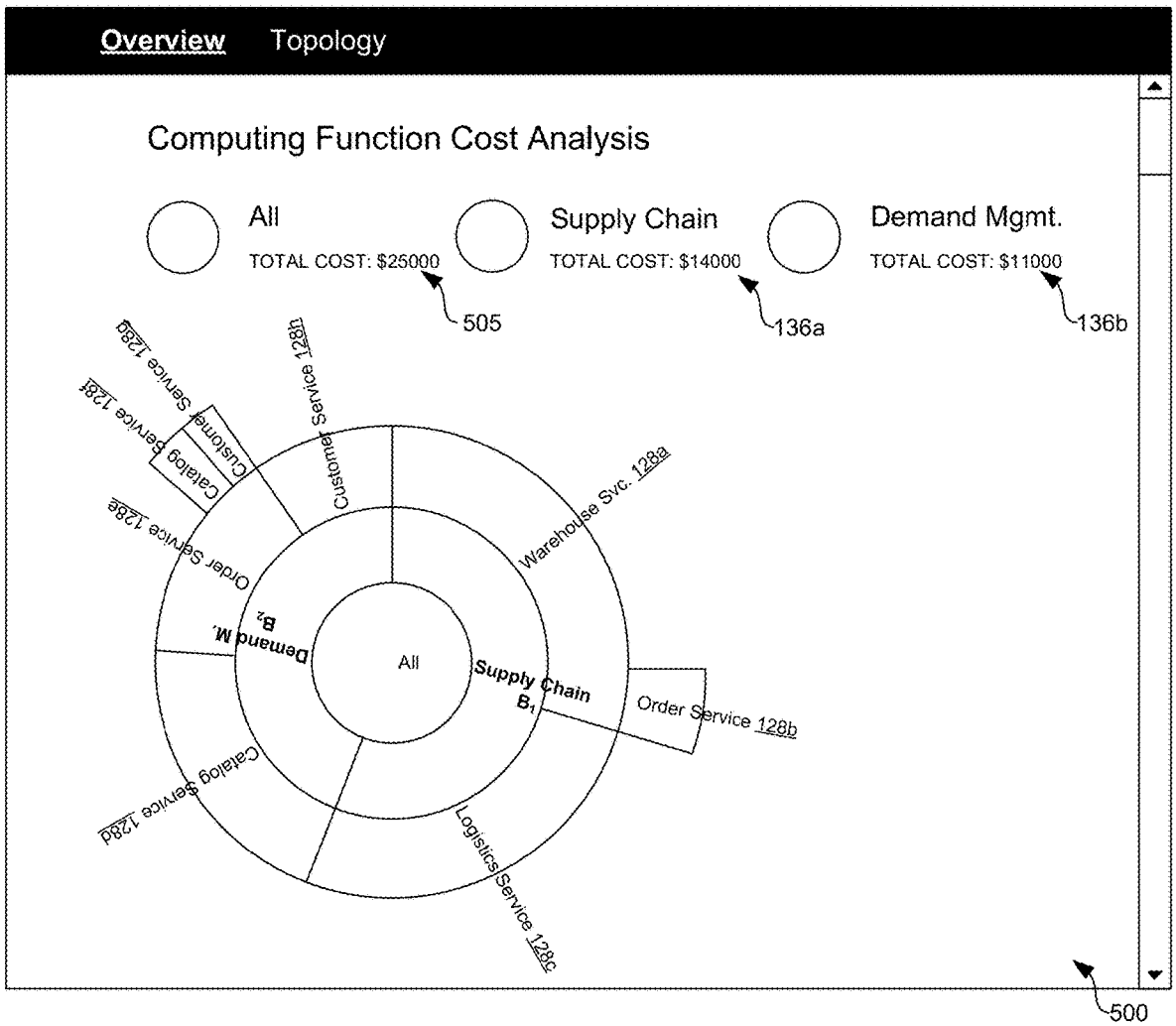
FIGS. 5-7 are user interfaces having charts and metrics showing utilization of services.
Figure 6:
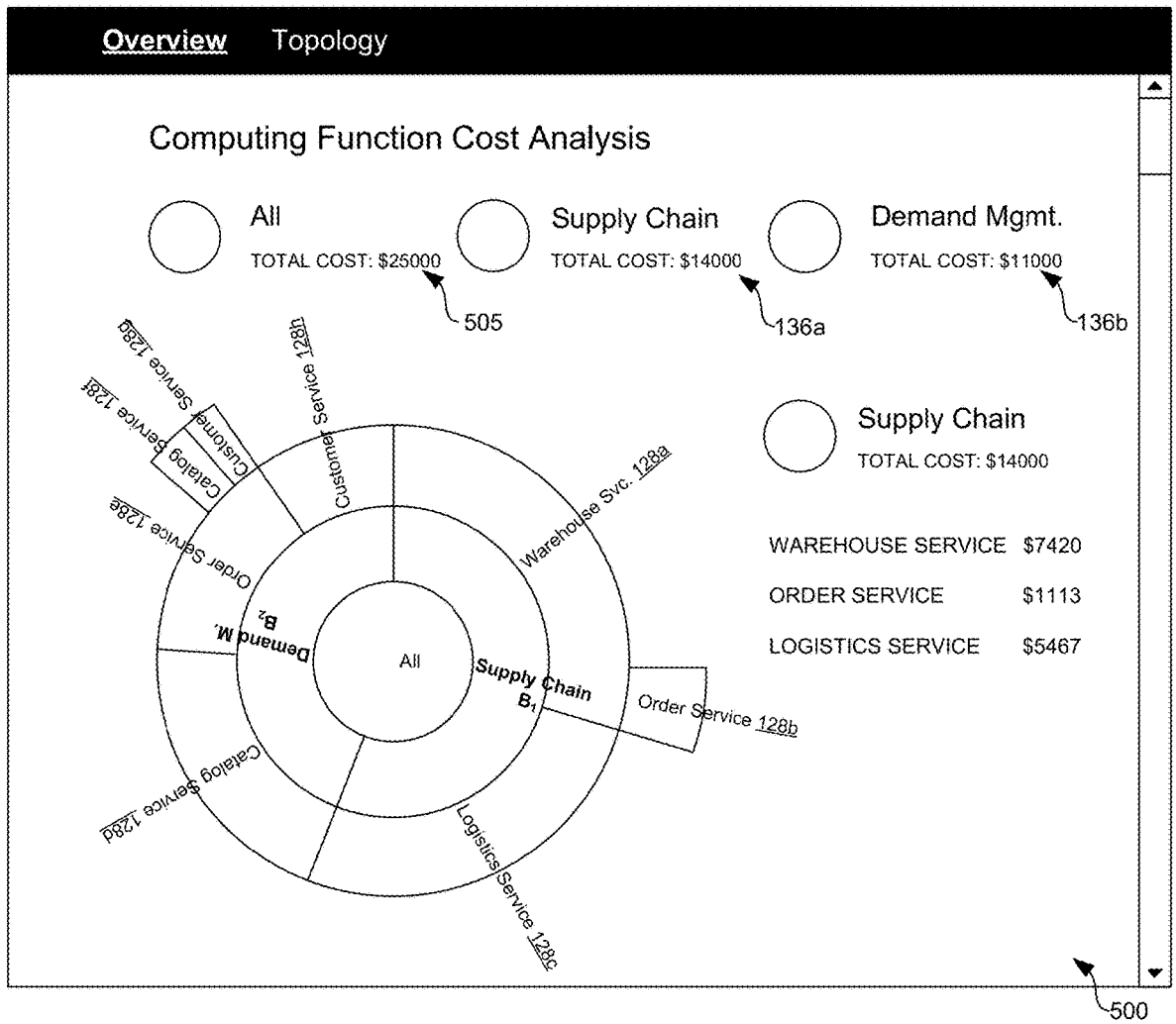
Figure 7:
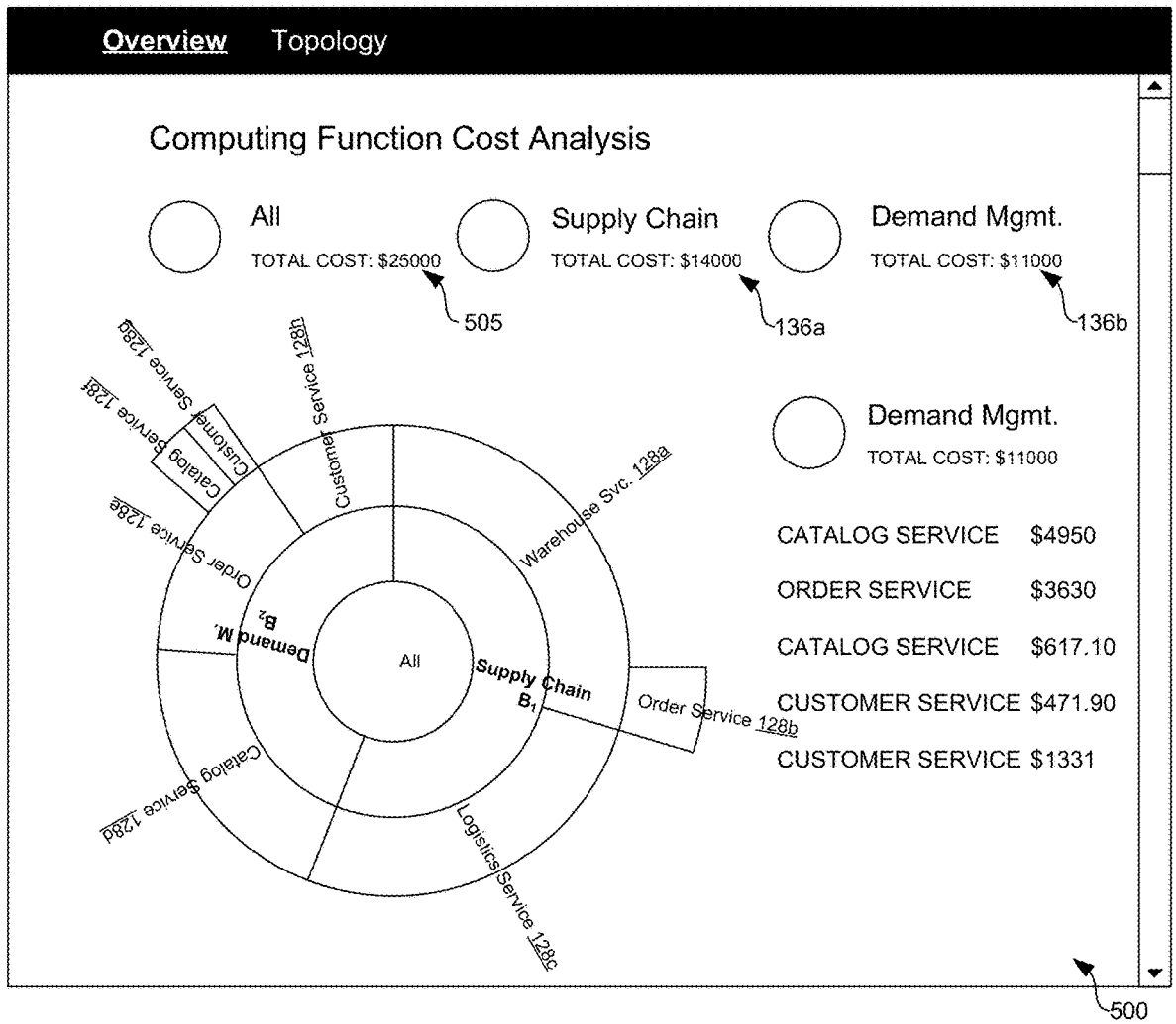

Turning now to FIGS. 5, 6, and 7, various user interfaces 500 are shown having charts and cost metrics 136 describing utilization of different ones of the computing services 128. It is understood that the user interface 500 can be sent to and rendered on the client devices 108 for evaluation and reporting, as can be appreciated. For instance, in FIG. 5, the user interface 500 can display cost metrics 136a, 136b for computing functions "Supply Chain" and "Demand Management" in association with the computing services 128 invoked. A total cost metric 505 is also shown as being a sum of the cost metrics 136a, 136b. In response to manipulating a portion of the user interface, a breakdown of costs for both the first computing function $B_1$ ("Supply Chain") and the second computing function $B_2$ ("Demand Management") can be displayed, as shown in FIGS. 6 and 7.

Figure 8:
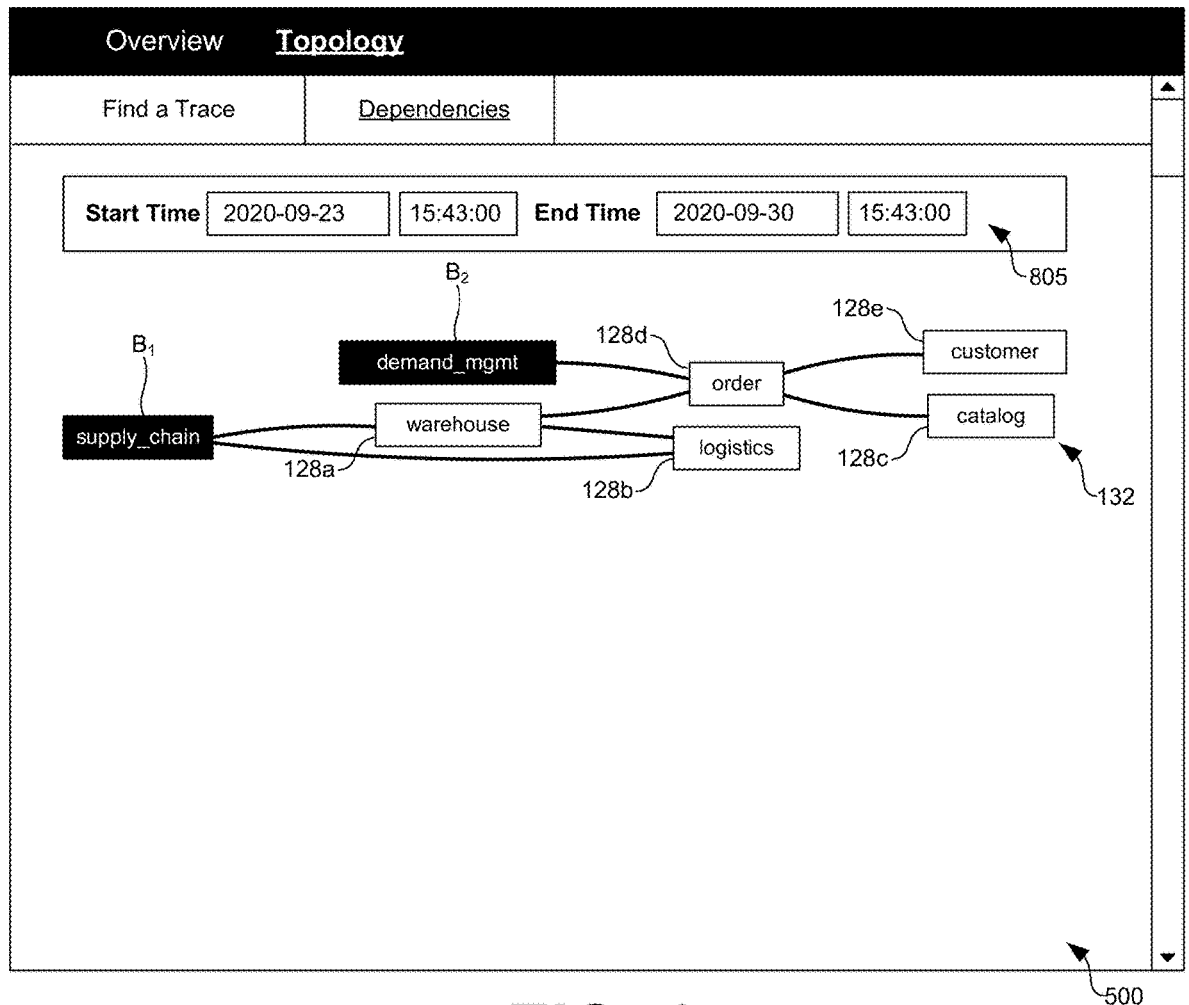
FIG. 8 is a user interface showing a service lineage graph generated using a stack tracing routine.

Referring next to FIG. 8, a user interface 500 is shown having a graphic depicting a service lineage 132 generated for both the first computing function $B_1$ ("Supply Chain") and the second computing function $B_2$ ("Demand Management"). In some examples, the service lineage 132 can be determined using a distributed tracing routine, such as Zipkin® or other similar service. In various examples, a request can be generated having a unique identifier which is transmitted to a first computing service 128a. The first computing service 128a (the "warehouse" service) will invoke other services (the "order" service, the "logistics" service, the "customer" service, and the "catalog" service), propagating the unique identifier through all downstream computing services 128. The unique identifier allows tracing the flow of requests between computing services 128. In addition, the user interface 500 can include a form 805 that permits the entry of a start time and an end time to only display the services 128 invoked in that window.

Figure 9:
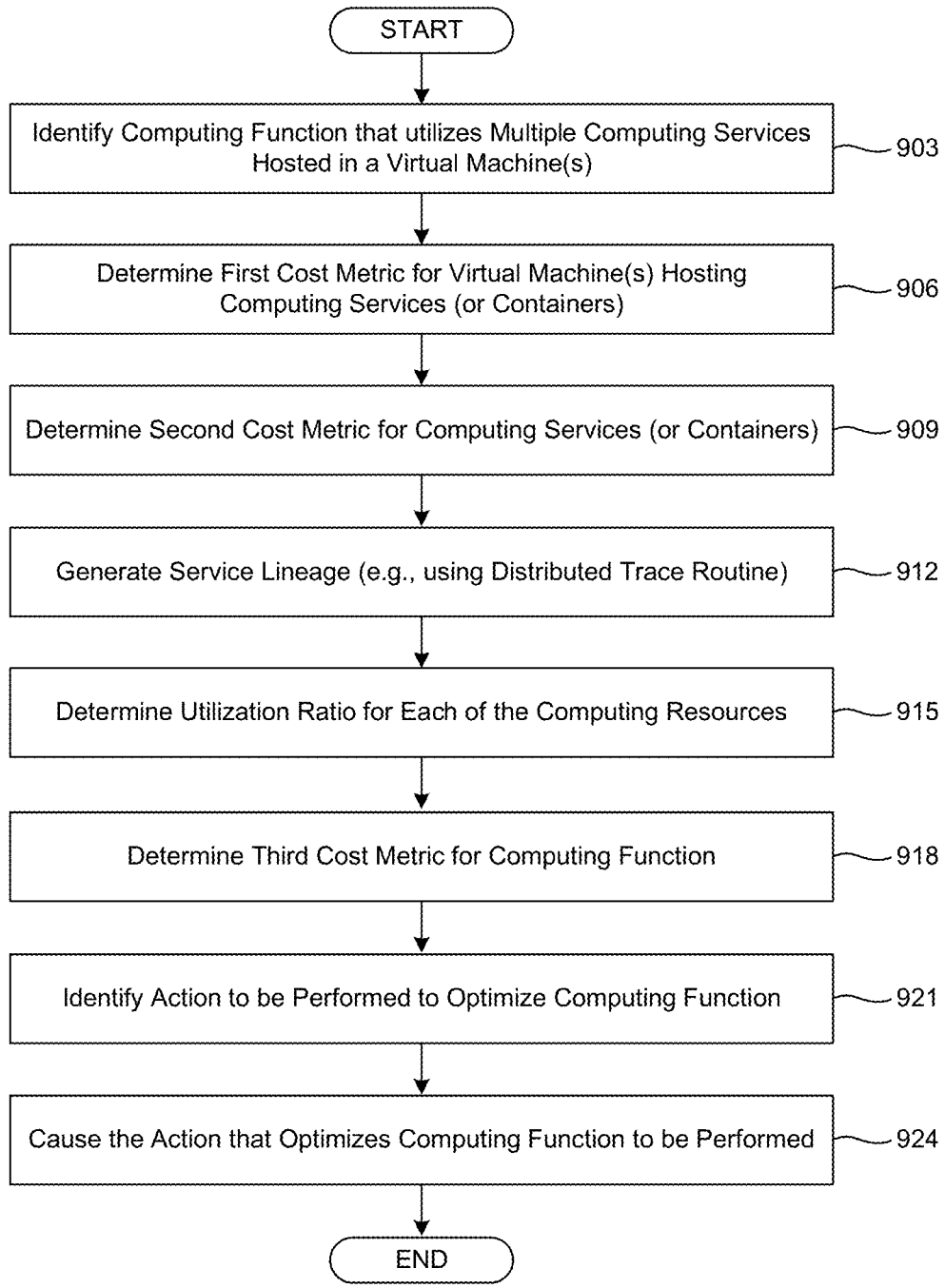
FIG. 9 is a flowchart illustrating functionality implemented by components of the networked computing environment of FIG. 2.

Moving on to FIG. 9, shown is a flowchart that provides one example of the operation of a portion of the networked environment 100. The flowchart of FIG. 9 can be viewed as depicting an example of elements of a method implemented by the computing environment management service 135 or the cost metric analysis service 140 executing in the computing environment 103 according to one or more examples. The separation or segmentation of functionality as discussed herein is presented for illustrative purposes only.

As noted above, with respect to the prevalent use of containers and micro-services, a computing function can leverage multiple computing services 128 to offer various computing functions. However, determining the infrastructure cost required to perform a computing function is challenging. For example, consider an entity that implements two primary computing functions $B_1$ and $B_2$ for its customers. The computing functions $B_1$ or $B_2$ can include a single sign-on function, a new user onboarding function, or other computing function as can be appreciated. Generally, distinct computing functions are managed by separate organizational departments or business verticals. For example, a first team of IT professionals, $D_1$, may manage computing function $B_1$ and a second team of IT professionals, $D_2$, may manage computing function $B_2$.

To implement the computing functions, each team may have developed a dedicated web-service. For instance, the first team may have built a computing service 128 $S_1$ to perform the computing function $B_1$ and the second team may have built a computing service 128 $S_2$ to perform the computing function $B_2$. However, computing services 128 are rarely self-sufficient and often require interaction with other computing services 128. For instance, computing services 128 $S_1$ and $S_2$ may both depend on a third computing service 128 $S_3$ for executing computing functions $B_1$ and $B_2$. The third computing service 128 $S_3$ may, however, be managed by a third team of engineers $D_3$.

At the infrastructure level, each computing service 128 can be deployed on a server 115 either as a container 129 or a virtual machine 126, and will incur costs for operating and maintaining the service. This cost will be assessed to the teams of engineers or the organizational department managing the computing services 128 which is, in turn, charged to an end customer. However, as the third computing service 128 $S_3$ may be used only internally by computing service 128 $S_1$ and computing service 128 $S_2$, the operating costs of the third computing service 128 $S_3$ should be included into costs for operating computing service 128 $S_1$ and computing service 128 $S_2$. Conventional systems often ignore or crudely estimate these costs, leading to gross inaccuracies in customer chargeback and budgeting.

In some examples, the cost of implementing a computing function can be determined as a weighted summation of cost of the computing services 128 required for executing the computing function. The weighted summation can include weights equal to a utilization ratio of a computing service 128 when implementing the computing function. Mathematically, it can be described as follows:

$$\text{Cost of Business Function } B_i = c_{B_i} = \Sigma_{j=1}^{n} c_{s_j} \times k_{ij} \quad \text{(eq. 1)},$$

where $c_{s_j}$ is the cost of the computing service 128 $s_j$ and $k_{ij}$ is a metric describing the utilization ratio of service $s_j$ in executing the computing function $B_i$. In various examples, different metrics can be considered for calculating the value $k_{ij}$, such as a request execution time, a number of requests, or other suitable metric. However, to accurately determine the costs of each computing service 128, the cost of the virtual machine 126 and the underlying hardware resources can be determined.

Beginning with step 903, the computing environment 103 can identify a computing function that utilizes multiple computing services 128 hosted in at least one virtual machine 126 (or a container 129 executing in the virtual machine 126). For instance, the computing environment 103 can receive a request for a cost of implementing a particular computing function, such as the cost of offering single sign-on functionality, the cost of opening a new user account, or other computing function.

In some examples, computing services 128 are deployed as containers 129, such as Linux® containers. Additionally, in some examples, it can be determined that no computing services 128 share the same container 129 as this is assumption is widely prevalent (and recommended) for microservice architecture implementations.

The cost of a computing service 128 can thus be the same as a cost of running the container 129 hosting the computing service 128, for instance, in a private cloud or a public cloud. To determine the cost of implementing a computing service 128 using a container 129 executing in a virtual machine 126, the computing environment 103 can first determine the cost of the hardware resources used by virtual machine 126 in implementing the container 129. Thereafter, the computing environment 103 can determine the virtual machine resources used by the container 129.

As such, in step 906, the computing environment 103 can determine a first cost metric 136 for one or more virtual machines 126 hosting a computing service 128 or a container 129 implementing the computing service 128. In some examples, the computing environment 103 can determine the first cost metric 136 based on, for example, hardware resources used by the virtual machine 126 in implementing the computing service 128. The hardware resources used by the at least one virtual machine 126 can include at least one of central processing unit (CPU) resources, memory resources, and disk storage resources.

In order to determine the cost metric 136 in step 906, in some examples, a cloud cost management service can be used, such as vRealize Business for Cloud (vRBC) by VMware® or other similar service. A cloud cost management service can include a financial management service that can determine costs of operating private and public cloud infrastructures. The cloud cost management service can identify all virtual machines 126 operated by an entity and divide costs of operating the virtual machines 126 based on respective hardware usage. In other words, the cost of the operating each virtual machine 126 can be determined based on the hardware resource usage of each virtual machine 126.

Next, in step 909, the computing environment 103 can determine a second cost metric 136 for individual ones of the computing services 128 or their corresponding containers 129 based on virtual machine resources used by the individual ones of the computing services 128 as well as the cost metric 136 determined in step 906. It is understood that the second cost metric 136 can be a function of the cost of the first cost metric 136, such as the cost of the virtual machine 126 hosting the computing services 128.

The cost of implementing a computing service 128 or a corresponding container 129 can be derived from the cost of operating the virtual machine 126 determined in step 906 by:

$$c_i = c_{vm_{CPU}} \times \frac{U_{i_{CPU}}}{\Sigma U_{i_{CPU}}} + c_{vm_{mem}} \times \frac{U_{i_{mem}}}{\Sigma U_{i_{mem}}} + c_{vm_{storage}} \times \frac{U_{i_{storage}}}{\Sigma U_{i_{storage}}}, \quad \text{(eq. 2)}$$

where $c_i$ is the cost of the ith container, $c_{vm_{CPU}}$ is the cost of the virtual machine CPU component, $c_{vm_{mem}}$ is the cost of the virtual machine memory component, $c_{vm_{storage}}$ is the cost of the virtual machine disk storage component, $U_{i_{CPU}}$ is the average CPU utilization of the ith container, $U_{i_{mem}}$ is the average memory utilization of the ith container, and $U_{i_{storage}}$ is the average storage utilization of the ith container.

The costs of the CPU, memory, and disk storage components of a virtual machine 126 can be obtained from vRBC or other cost management service. To obtain CPU, memory, and storage utilization values for the computing services 128 or their corresponding containers 129, an application programming interface (API) for container management service can be queried, such as the Docker Engine HTTP API. A container management service, for example, can provide a list of containers managed by an engine while providing real time utilization statistics of individual containers 129.

As a computing function can invoke or utilize computing services 128 that are used by other non-related computing functions, assigning an entirety of the cost of operating the computing services 128 would inaccurately assign costs to the computing function. Instead, the overall cost of the computing services 128 should be divided among the respective computing functions based on their utilization of the computing services 128. In order to determine the utilization of the computing services 128, a service lineage 132 can be generated, as illustrated in FIG. 7.

Accordingly, in step 912, the computing environment 103 can generate a service lineage 132, or a lineage of computing services 128 used in performing a computing function. For instance, to perform a single sign-on operation, a computing function can invoke an authentication service, which invokes other downstream computing services 128. A service lineage 132 can be visualized as a directed acyclic graph (DAG) similar to the example shown in FIG. 1.

In some examples, the service lineage 132 can be determined using a distributed tracing routine 220, such as Zipkin® or other similar routine. In one example, a request can be generated having a unique identifier which is transmitted to a first computing service 128. The first computing service 128 will invoke other computing services 128, propagating the unique identifier downstream. The unique identifier allows tracing the flow of requests between computing services 128. In addition, the distributed tracing routine 220 can record a start time and an end time at each stage in the service lineage 132.

Thereafter, in step 915, the computing environment 103 can determine a utilization ratio for individual ones of the computing services 128 in performing the computing function. In some examples, the utilization ratio can be determined based on an average execution time, a number of requests, or other metric as can be appreciated. For instance, using the service lineage 132 determined in step 912, the average execution time of a computing service in executing a computing function can be derived from the request time data. Using the average execution time determined from the service lineage 132, the utilization ratio of service $S_j$ for executing computing function $B_i$ can be determined using the request execution time by:

$$k_{ij} = \frac{t_{ij}}{\sum_{k=1}^{n} t_{kj}}, \quad \text{(eq. 3)}$$

where $t_{ij}$ is the average request execution time of a service $S_j$ for a computing function $B_i$.

In step 918, the computing environment 103 can determine a third cost metric 136 for the computing function. In various examples, the computing environment 103 can generate the third cost metric 136 using eq. 1 or as a function of the utilization ratio and the second cost metric 136 determined in step 909. For instance, by inputting the utilization ratio determined in step 915 and the second cost metric 136 determined in step 909 in eq. 1, the cost metric 136 of performing the computing function can be determined.

Next, in step 921, the computing environment 103 can identify an action to be performed to optimize the computing function based at least in part on the third cost metric. In some examples, the action can include migrating one or more of the computing services 128 to a server 115, virtual machine 126, container 129 or other computing system having lower bandwidth, access to less costly computing resources, or higher computational efficiency.

In step 924, the computing environment 103 can perform the action identified in step 921. As can be appreciated, the action can include a task that the computing environment 103 can perform autonomously or at the direction of an IT administrator that optimizes the computing function by reducing the third cost metric determined in step 918. Thereafter, the process can proceed to completion.

Stored in the memory device are both data and several components that are executable by the processor. Also stored in the memory can be a data store 130 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices 108 can be used to access user interfaces generated to configure or otherwise interact with the computing environment management service 135. These client devices 108 can include a display upon which a user interface generated by a client application for providing a virtual desktop session (or other session) can be rendered. In some examples, the user interface can be generated using user interface data provided by the computing environment 103. The client device 108 can also include one or more input/output devices that can include, for example, a capacitive touchscreen or other type of touch input device, fingerprint reader, or keyboard.

Although the computing environment management service 135 and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system for determining a cost metric of computing resource usage in performing a computing function that utilizes multiple computing services, comprising:
 at least one computing device;
 program instructions stored in memory and executable in the at least one computing device that, when executed by the at least one computing device, direct the at least one computing device to:
  identify a computing function that utilizes a plurality of computing services hosted in at least one virtual machine;
  determine a first cost metric for the at least one virtual machine based on hardware resources used by the at least one virtual machine;
  determine a second cost metric for individual ones of the computing services based on virtual machine resources used by the computing services and the first cost metric;
  generate a utilization ratio for individual ones of the computing services based on an average execution time for executing the computing function relative to a summation of the execution time for other computing services, the average execution time based on tracing a flow of a unique identifier throughout the computing services, wherein the utilization ratio is determined by performing a distributed tracing routine that generates a service lineage comprising each of the computing services;
  determine a third cost metric for the computing function based on the second cost metric and the utilization ratio; and
  in response to the third cost metric being determined, perform an action that optimizes performance of the computing function based on the third cost metric, wherein the action comprises migration of the plurality of computing services to a second at least one virtual machine associated with a lower cost metric than the third cost metric.

2. The system of claim 1, wherein the distributed tracing routine is performed by:
 submitting a request to one of the computing services, wherein the request comprises the unique identifier;
 generating a start time and an end time for individual ones of the computing services in processing the request; and
 determining the utilization ratio based on the start time and the end time generated for the individual ones of the computing services.

3. The system of claim 1, wherein the hardware resources used by the at least one virtual machine comprise at least one of: central processing unit (CPU) resources; memory resources; and disk storage resources.

4. The system of claim 1, wherein the virtual machine resources used by the individual ones of the computing services comprise at least one of: a virtual machine central processing unit (CPU) component; a virtual machine memory component; and a virtual machine disk storage component.

5. The system of claim 4, wherein the second cost metric is further determined by identifying a plurality of containers used to implement the computing services, the containers being hosted in the at least one virtual machine; and
 wherein the second cost metric is determined for individual ones of the containers based on utilization of the virtual machine resources.

6. The system of claim 5, wherein the third cost metric is determined for the computing function as a weighted summation of the second cost metric determined for the individual ones of the containers.

7. A non-transitory computer-readable medium for determining a cost metric of computing resource usage in performing a computing function that utilizes multiple computing services, comprising program code executable in at least one computing device that, when executed by the at least one computing device, directs the at least one computing device to:
 identify a computing function that utilizes a plurality of computing services hosted in at least one virtual machine;
 determine a first cost metric for the at least one virtual machine based on hardware resources used by the at least one virtual machine;
 determine a second cost metric for individual ones of the computing services based on virtual machine resources used by the computing services and the first cost metric;
 generate a utilization ratio for individual ones of the computing services based on an average execution time for executing the computing function relative to a summation of the execution time for other computing services, the average execution time based on tracing a flow of a unique identifier throughout the computing services, wherein the utilization ratio is determined by performing a distributed tracing routine that identifies a service lineage comprising each of the computing services;

determine a third cost metric for the computing function based on the second cost metric and the utilization ratio; and in response to the third cost metric being determined, perform an action that optimizes performance of the computing function based on the third cost metric, wherein the action comprises migration of the plurality of computing services to a second at least one virtual machine associated with a lower cost metric than the third cost metric.

8. The non-transitory computer-readable medium of claim 7, wherein the distributed tracing routine is performed by:

submitting a request to one of the computing services, wherein the request comprises the unique identifier;

generating a start time and an end time for individual ones of the computing services in processing the request; and determining the utilization ratio based on the start time and the end time generated for the individual ones of the computing services.

9. The non-transitory computer-readable medium of claim 7, wherein the hardware resources used by the at least one virtual machine comprise at least one of: central processing unit (CPU) resources; memory resources; and disk storage resources.

10. The non-transitory computer-readable medium of claim 7, wherein the virtual machine resources used by the individual ones of the computing services comprise at least one of: a virtual machine central processing unit (CPU) component; a virtual machine memory component; and a virtual machine disk storage component.

11. The non-transitory computer-readable medium of claim 10, wherein the second cost metric is further determined by identifying a plurality of containers used to implement the computing services, the containers being hosted in the at least one virtual machine; and wherein the second cost metric is determined for individual ones of the containers based on utilization of the virtual machine resources.

12. The non-transitory computer-readable medium of claim 11, wherein the third cost metric is determined for the computing function as a weighted summation of the second cost metric determined for the individual ones of the containers.

13. A computer-implemented method for determining a cost metric of computing resource usage in performing a computing function that utilizes multiple computing services, comprising:

identifying a computing function that utilizes a plurality of computing services hosted in at least one virtual machine;

determining a first cost metric for the at least one virtual machine based on hardware resources used by the at least one virtual machine;

determining a second cost metric for individual ones of the computing services based on virtual machine resources used by the computing services and the first cost metric;

generating a utilization ratio for individual ones of the computing services based on an average execution time for executing the computing function relative to a summation of the execution time for other computing services, the average execution time based on tracing a flow of a unique identifier throughout the computing services, wherein the utilization ratio is determined by performing a distributed tracing routine that identifies a service lineage comprising each of the computing services;

determining a third cost metric for the computing function based on the second cost metric and the utilization ratio; and in response to the third cost metric being determined, performing an action that optimizes performance of the computing function based on the third cost metric, wherein the action comprises migration of the plurality of computing services to a second at least one virtual machine associated with a lower cost metric than the third cost metric.

14. The computer-implemented method of claim 13, wherein the distributed tracing routine is performed by:

submitting a request to one of the computing services, wherein the request comprises the unique identifier;

generating a start time and an end time for individual ones of the computing services in processing the request; and determining the utilization ratio based on the start time and the end time generated for the individual ones of the computing services.

15. The computer-implemented method of claim 13, wherein the hardware resources used by the at least one virtual machine comprise at least one of: central processing unit (CPU) resources; memory resources; and disk storage resources.

16. The computer-implemented method of claim 13, wherein the virtual machine resources used by the individual ones of the computing services comprise at least one of: a virtual machine central processing unit (CPU) component; a virtual machine memory component; and a virtual machine disk storage component.

17. The computer-implemented method of claim 16, wherein the second cost metric is further determined by identifying a plurality of computing containers used to implement the computing services, the computing containers being hosted in the at least one virtual machine;

wherein the second cost metric is determined for individual ones of the computing services based on utilization of the virtual machine resources; and wherein the third cost metric is determined for the computing function as a weighted summation of the second cost metric determined for the individual ones of the containers.

* * * * *